United States Patent
Mestha et al.

(10) Patent No.: US 8,564,830 B2
(45) Date of Patent: *Oct. 22, 2013

(54) SENSITIVITY MATRIX DETERMINATION VIA CHAIN RULE OF DIFFERENTIATION

(75) Inventors: Lalit Keshav Mestha, Fairport, NY (US); Sohail A. Dianat, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 700 days.

This patent is subject to a terminal disclaimer.

(21) Appl. No.: 12/819,591

(22) Filed: Jun. 21, 2010

(65) Prior Publication Data

US 2010/0253960 A1    Oct. 7, 2010

Related U.S. Application Data

(63) Continuation of application No. 12/024,221, filed on Feb. 1, 2008, now Pat. No. 7,782,490.

(51) Int. Cl.
*G06F 15/00* (2006.01)

(52) U.S. Cl.
USPC ............ 358/1.9; 358/504; 358/518; 382/167; 356/940

(58) Field of Classification Search
None
See application file for complete search history.

(56) References Cited

U.S. PATENT DOCUMENTS

| 6,157,469 | A | 12/2000 | Mestha |
| 7,295,215 | B2* | 11/2007 | Klassen ........................ 345/604 |
| 2005/0071104 | A1* | 3/2005 | Viturro et al. ................... 702/85 |
| 2006/0197966 | A1* | 9/2006 | Viturro et al. .................. 358/1.9 |
| 2008/0130022 | A1* | 6/2008 | Dalal et al. ..................... 358/1.9 |
| 2009/0195797 | A1 | 8/2009 | Mestha et al. |

OTHER PUBLICATIONS

R. Balasubramanian, Optimization of the spectral Neugebauer model for printer characterization, Journal of Electronic Imaging 8(2), 156-166 (Apr. 1999).*

* cited by examiner

*Primary Examiner* — Paul F Payer
(74) *Attorney, Agent, or Firm* — Philip E. Blair; Fleit Gibbons Gutman Bongini & Bianco P.L.

(57) ABSTRACT

What is provided are a novel system and method for generating a sensitivity matrix for adaptive color control in a color marking device. In one embodiment, a first and second color space is identified. A total of N intermediate components are identified. Component sensitivity matrices are calculated and a sensitivity matrix is generated using a chain rule of differentiation over each successive component sensitivity matrix. The present method facilitates calibration of dynamically varying color reproduction devices.

5 Claims, 3 Drawing Sheets

SENSITIVITY MATRIX DETERMINATION VIA CHAIN RULE OF DIFFERENTIATION

CROSS REFERENCE TO RELATED APPLICATION

This patent application is related to commonly owned U.S. patent Ser. No. 12/024,221 entitled: "Sensitivity Matrix Determination For Adaptive Color Control", which is incorporated herein in its entirety by reference.

TECHNICAL FIELD

The present invention is directed to systems and methods for generating a sensitivity matrix for adaptively correcting color in a color marking device.

BACKGROUND

In the color reproduction industry, Tone Reproduction Curves (TRCs) are stored plots of an input color parameter value versus an output color parameter value for a particular color separation of a color marking device. A TRC is a monotonically increasing function which indicates the value of the output parameter for a specific device that is used to reproduce the input parameter (if the input and output parameters are exactly equal then the inputs and outputs are expressed in the same coordinate space). TRCs are obtained by printing a number of patches and measuring color values from the printed patches. Colors are often measured using offline spectrophotometers and measured color values are then modified, generally, by using model based algorithms to produce the desired TRCs. Usually this process of printing, measuring, and producing TRCs is iterated several times until a satisfactory result is obtained. This approach can be time consuming and expensive. Sensitivity matrices are used in this regard to facilitate the generation of TRCS and the calibration of color marking devices. As such, increasingly sophisticated methods are needed for generating sensitivity matrices for color marking devices capable of device independent color correction.

INCORPORATED REFERENCES

The following U.S. patents, U.S. patent applications, and Publications are incorporated herein in their entirety by reference.

"Dynamic Device Independent Image Correction Method And Apparatus", U.S. Pat. No. 6,157,469, to Mestha.

"*Color Technology for Electronic Imaging Devices*", Henry R. Kang, SPIE Publications, (1997), ISBN-13: 978-0819421081.

"*The Reproduction of Color in Photography, Printing and Television*", R. W. G. Hunt, 4$^{th}$ Ed., Fountain Press Ltd. (1987), ISBN-13: 978-0863430886.

"*Principles of Color Technology*", Billmeyer and Saltzman, Wiley-Interscience 3$^{rd}$ Ed, (2000), ISBN-13: 978-0471194590.

"*Digital Color Imaging Handbook*", 1$^{st}$ Ed., CRC Press (2003), ISBN-13: 97808-4930-9007.

"*Control of Color Imaging Systems: Analysis and Design*", CRC Press (2009), ISBN-13: 97808-4933-7468.

"*The Reproduction of Colour*", R. W. G. Hunt, Wiley 6$^{th}$ Ed (2004), ISBN-13: 978-0470024256.

BRIEF SUMMARY

What is provided are a novel system, method, and computer program product for generating a sensitivity matrix. The methods hereof facilitate calibration of a dynamically varying color marking devices capable of device-independent color correction.

In one example embodiment, the present method for generating a sensitivity matrix involves the following. A first color space $CS_1$ of a first color device and a second color space $CS_2$ of a second color device are identified. A total of N intermediate components, given by: $IC_i$, where i=1 to N, are identified. Example intermediate components can be any of: RGB, CMYK, CMYKOV, cmyk, W, R($\lambda$), and XYZ. Once the color spaces and the intermediate components have been identified, a first component sensitivity matrix is calculated as a gradient of the first color space $CS_1$ computed with respect to the first intermediate component $IC_1$. In the notation hereof, the first component sensitivity matrix comprises: $\nabla_{IC_1}^{CS_1}$. Then, for each remaining intermediate component, where i=2 to N, on each successive iteration the i$^{th}$ component sensitivity matrix comprises the gradient of a previous intermediate component $IC_{i-1}$ computed with respect to the current intermediate component $IC_i$. Each i$^{th}$ component sensitivity matrix can be represented by: $\nabla_{IC_i}^{IC_{i-1}}$. After the N$^{th}$ component sensitivity matrix has been calculated, a last component sensitivity matrix is calculated as a gradient of the N$^{th}$ intermediate component $IC_N$ computed with respect to the second color space $CS_2$. This last component sensitivity matrix is given by: $\nabla_{CS_2}^{IC_N}$. Once all of the component matrices have been calculated, a sensitivity matrix is generated using a chain rule of differentiation over each successive component sensitivity matrix. In the above-described notation, where i=1 to N, the sensitivity matrix generated in accordance with the teachings hereof would be written as follows:

$$\beta = \nabla_{IC_{i=1}}^{CS_1} \times \nabla_{IC_{i=2}}^{IC_{i=1}} \times \nabla_{IC_{i=3}}^{IC_{i=2}} \times \ldots \times \nabla_{IC_{i=N}}^{IC_{i=N-1}} \times \nabla_{CS_2}^{IC_{i=N}}.$$

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
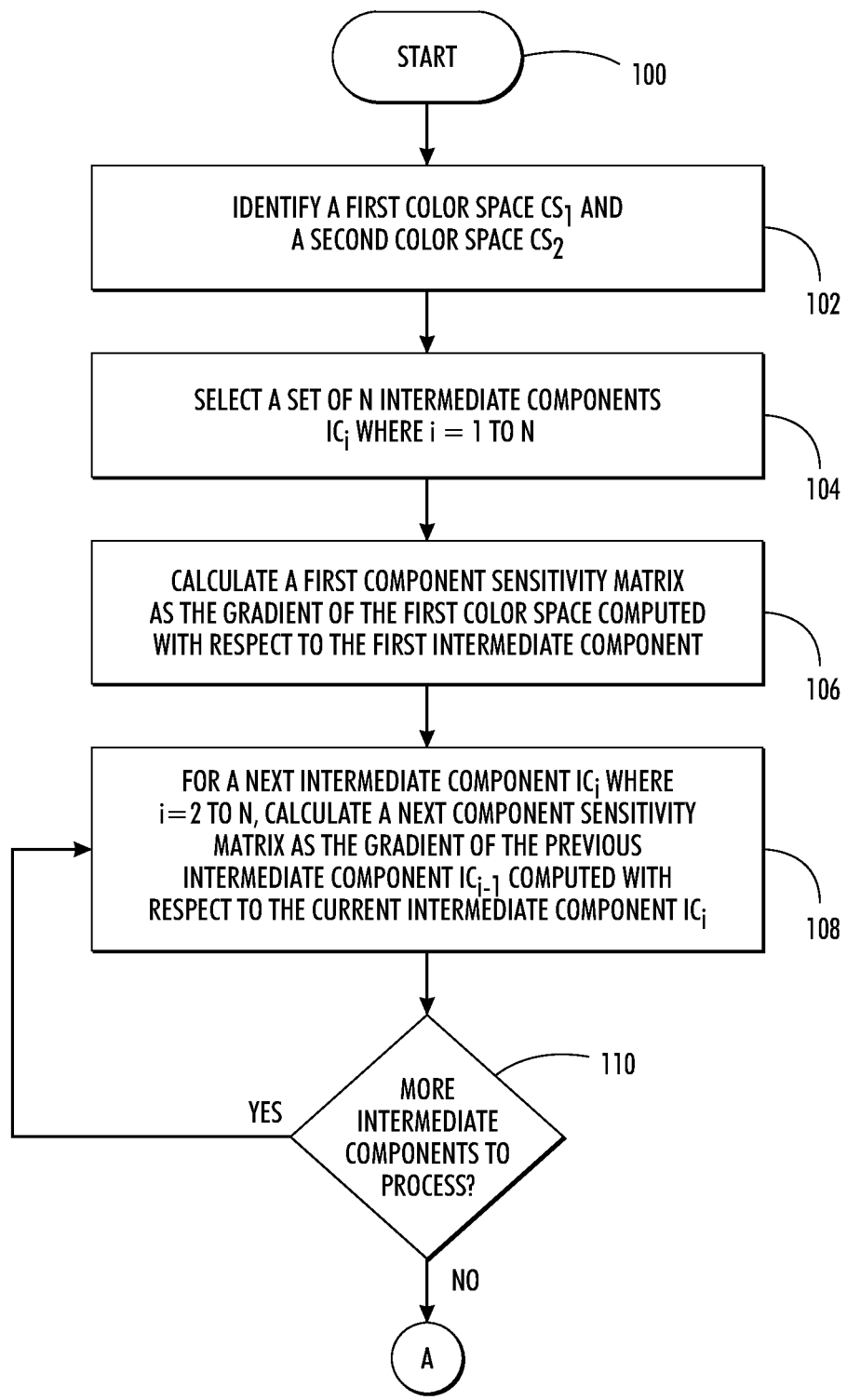
FIG. 1 is a flow diagram illustrating one embodiment of the present method of generating a sensitivity matrix.

What is provided are a novel system and method for generating a sensitivity matrix for adaptive color control in a color marking device. These various embodiments, and any modifications thereof, can be integrated with the iterative color control system in various forms by one of ordinary skill in this art depending on the product needs. These embodiments can be performed in a transparent fashion to customers, if required, thereby making the color system adaptive.

It should be understood that one of ordinary skill in this art would be readily familiar with many facets of color science and other related techniques and algorithms common to the color science arts.

NON-LIMITING DEFINITIONS

A "color model" is an abstract mathematical model describing the way colors can be represented (e.g. RGB and CMYK are color models). A color model with no associated mapping function to an absolute color space is a more or less arbitrary color system with no connection to any globally-understood system of color interpretation. Adding a mapping function between the color model and a reference color space results in a footprint within the color space. This footprint is the gamut which, in combination with the color model, defines the color space. Example color spaces are as follows:

RGB color space, as used herein, refers to any additive color space based upon the RGB color model. Example RGB color spaces are: ISO-RGB, Extended ISO-RGB, sRGB, scRGB, ROMM RGB, Apple RGB, PhotoPro RGB, Adobe RGB, and Adobe Wide Gamut.

CMYK color space refers to any subtractive color space. CMYK refers to the four inks used in some color printing: Cyan, Magenta, Yellow, and Black. Example CMYK color spaces are: CMYK, CcMmYK, cmyk, and CMYKOV.

CIE color space refers to any color space based on a CIE standard. Example CIE defined color spaces are: CIEXYZ, CIELAB, CIELUV, CIEYUV, and CIEUVW.

YUV color space encodes a color image or video by taking human perception into account thereby allowing reduced bandwidth for chrominance components. Example YUV color spaces are: YUV(PAL), Y'UV, YDbDr(SECAM), YIQ (NTSC), YCbCr, YPbPr, and xvYCC.

HSV color space, also known as HSB (hue, saturation, brightness), is a transformation of an RGB color space, and its components and colorimetry are relative to the RGB color space from which it was derived.

HSL color space, is quite similar to HSV, with "lightness" replacing "brightness". The difference is that the brightness of a pure color is equal to the brightness of white, while the lightness of a pure color is equal to the lightness of a medium gray. Example HSL color spaces are: HLS, HSI (hue, saturation, intensity) and TSD (hue, saturation, darkness), LMS color space is represented by the response of the three types of cones of the human eye, named after their responsivity (sensitivity) at long, medium and short wavelengths. It is common to use the LMS color space when performing chromatic adaptation (estimating the appearance of a sample under a different illuminant).

Other color spaces are: RYB, NCS, PMS, RAL, OSA-UCS, RG, DIN, PCCS, ABC, DCA, JIS-Z8102, ISCC-NBS, Hexachrome, Coloroid, Ostwald, Munsell, and Imaginary.

An "intermediate component" is a color model based upon any of the above-defined color spaces which, when calculated as a gradient computed with respect to another intermediate component, produces a component sensitivity matrix. Example intermediate components comprise any components of the above-defined color spaces and further include a weighting W, and a reflectance spectra $R(\lambda)$. For example, if a first intermediate component is CMYKOV and a second intermediate component is $R(\lambda)$, then the gradient of the first intermediate component computed with respect to the second intermediate component produces the component sensitivity matrix: $\nabla_{R(\lambda)}^{CMYKOV}$, where $R(\lambda)$ is a measured reflectance spectra.

The "sensitivity matrix" represents the sensitivity of output color with respect to the input digital values at particular nominal input digital color values. A sensitivity matrix can be expressed in terms of analytical expressions. The analytical expressions are derived using a chain rule of differentiation. For the Neugebauer model with random mixing, the sensitivity matrix is expressed in terms of a plurality of component matrices each comprising a measure of sensitivity of different parameters associated with the Neugebauer model. For example, the sensitivity matrix B generated as the gradient of L*a*b* computed with respect to CMYK can be written as:

$$B = \nabla_{CMYK}^{L^*a^*b^*} = \begin{bmatrix} \frac{\partial L^*}{\partial C} & \frac{\partial L^*}{\partial M} & \frac{\partial L^*}{\partial Y} & \frac{\partial L^*}{\partial K} \\ \frac{\partial a^*}{\partial C} & \frac{\partial a^*}{\partial M} & \frac{\partial a^*}{\partial Y} & \frac{\partial a^*}{\partial K} \\ \frac{\partial b^*}{\partial C} & \frac{\partial b^*}{\partial M} & \frac{\partial b^*}{\partial Y} & \frac{\partial b^*}{\partial K} \end{bmatrix}.$$

The "chain rule of differentiation" is a formula for the derivative of a composition of two functions. The chain rule is a fundamental property of all definitions of derivatives. In intuitive terms, if a variable y depends on a second variable u which, in turn, depends on a third variable x such that y=y(u(x)), then the rate of change of y with respect to x can be computed as the rate of change of y with respect to u multiplied by the rate of change of u with respect to x. For the Neugebauer model with random mixing, the sensitivity matrix B can be expressed in terms of five different component matrices, wherein each component sensitivity matrix is a sensitivity matrix reflecting a measure of sensitivity of a different parameter associated with the Neugebauer model, as shown by:

$$B = \nabla_{XYZ}^{L^*a^*b^*} \times \nabla_{R(\lambda)}^{XYZ} \times \nabla_{W}^{R(\lambda)} \times \nabla_{cmyk}^{W} \times \nabla_{CMYK}^{cmyk}.$$

Reference is now being made to the flow diagram of FIG. 1 which illustrates one example embodiment of the present method for generating a sensitivity matrix. Flow processing begins at step 100 and immediately proceeds to step 102.

At step 102, first color space $CS_1$ of a first color device and a second color space $CS_2$ of a second color device are identified. The first and second color spaces are different. The first and second color spaces may comprise any of: RGB color space, CMYK color space, CIE color space, YUV color space, HSV color space, HSL color space, and LMS color space. These may also comprise: Hexachrome, RYB, Munsell, NCS, PMS, RAL, OSA-UCS, Coloroid, RG, Ostwald, DIN, PCCS, ABC, DCA, JIS Z8102, ISCC-NBS, and Imaginary. For example, for discussion purposes hereof, assume that the first identified color space is RGB and the second identified color space is CMYK.

At step 104, a set of N intermediate components, given by: $IC_i$, where i=1 to N, are identified or are otherwise selected. For example, for discussion hereof, assume that the set of intermediate components are, in order, as follows: CMYKOV, cmyk, W, and $R(\lambda)$. Thus N=4. Identifying the first and second color spaces and/or any of the set of intermediate components may involve retrieving these from a memory or storage or from a remote device over a network or may be otherwise provided by a user using a graphical user interface of, for instance, a computer workstation. Once the first and second color spaces and the set of intermediate components have been identified, selected, retrieved, or otherwise entered by a user, component matrices can next be calculated. It should be appreciated that various other combinations and permutations would necessarily follow the same methodology as described herein further. The appended claims are intended to cover variants of these components and color spaces such as, for example, sRGB.

At step 106, a first component sensitivity matrix is calculated as a gradient of the first color space $CS_1$ computed with respect to a first intermediate component $IC_1$. In the general notation hereof, this first component sensitivity matrix is given by: $\nabla_{IC_1}^{CS_1}$. In the example hereof, the first color space is RGB and the first intermediate component is CMYKOV. Thus, calculating the gradient of RGB computed with respect to CMYKOV produces the first component sensitivity matrix given by: $\nabla_{CMYKOV}^{RGB}$.

At step 108, for a next intermediate component, where i=2 to N, a next ($i^{th}$) component sensitivity matrix is calculated. This next component sensitivity matrix comprises a gradient of the previous intermediate component $IC_{i-1}$ computed with respect to the current intermediate component $IC_i$. In the notation hereof, the next component sensitivity matrix comprises: $\nabla_{IC_i}^{IC_{i-1}}$. As such, on a first iteration where i=2, the $2^{nd}$ component sensitivity matrix is computed as the gradient of the previous intermediate component $IC_1$ computed with respect to the current intermediate component $IC_2$. On a first iteration, where CMYKOV is the $1^{st}$ (previous) intermediate component and cmyk is the $2^{nd}$ (current) intermediate component, the $2^{nd}$ component sensitivity matrix would be given as: $\nabla_{cmyk}^{CMYKOV}$.

At step 110, a determination is made whether more intermediate components remain to be processed. If so, then processing repeats with respect to step 108 wherein, on a next iteration, where if i=3, a $3^{rd}$ component sensitivity matrix is calculated as the gradient of the previous intermediate component $IC_2$ computed with respect to current intermediate component $IC_3$. In this example, the $3^{rd}$ component sensitivity matrix is given by: $\nabla_W^{cmyk}$, where cmyk is the previous ($2^{nd}$) intermediate component and W is the current ($3^{rd}$) intermediate component. It should be understood that W is a weighting factor. On a next iteration, where i=4, the $4^{th}$ component sensitivity matrix is calculated as the gradient of the previous (3rd) intermediate component $IC_3$ computed with respect to the current ($4^{th}$) intermediate component $IC_4$. In this example, the $4^{th}$ component sensitivity matrix is given by: $\nabla_{R(\lambda)}^W$, where W is the $3^{rd}$ intermediate component and $R(\lambda)$ is the $4^{th}$ intermediate component. Processing repeats in such a manner until component sensitivity matrices have been calculated.

Figure 2:
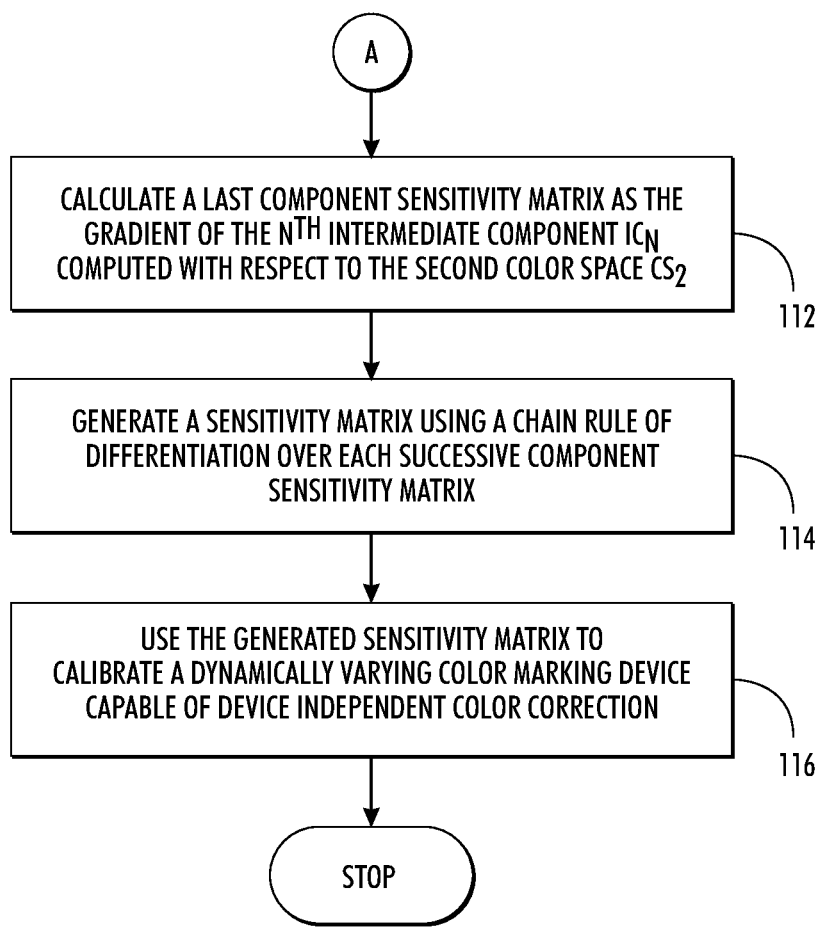
FIG. 2 which is a continuation of the flow diagram of FIG. 1 with flow processing continuing with respect to node A.
Figure 3:
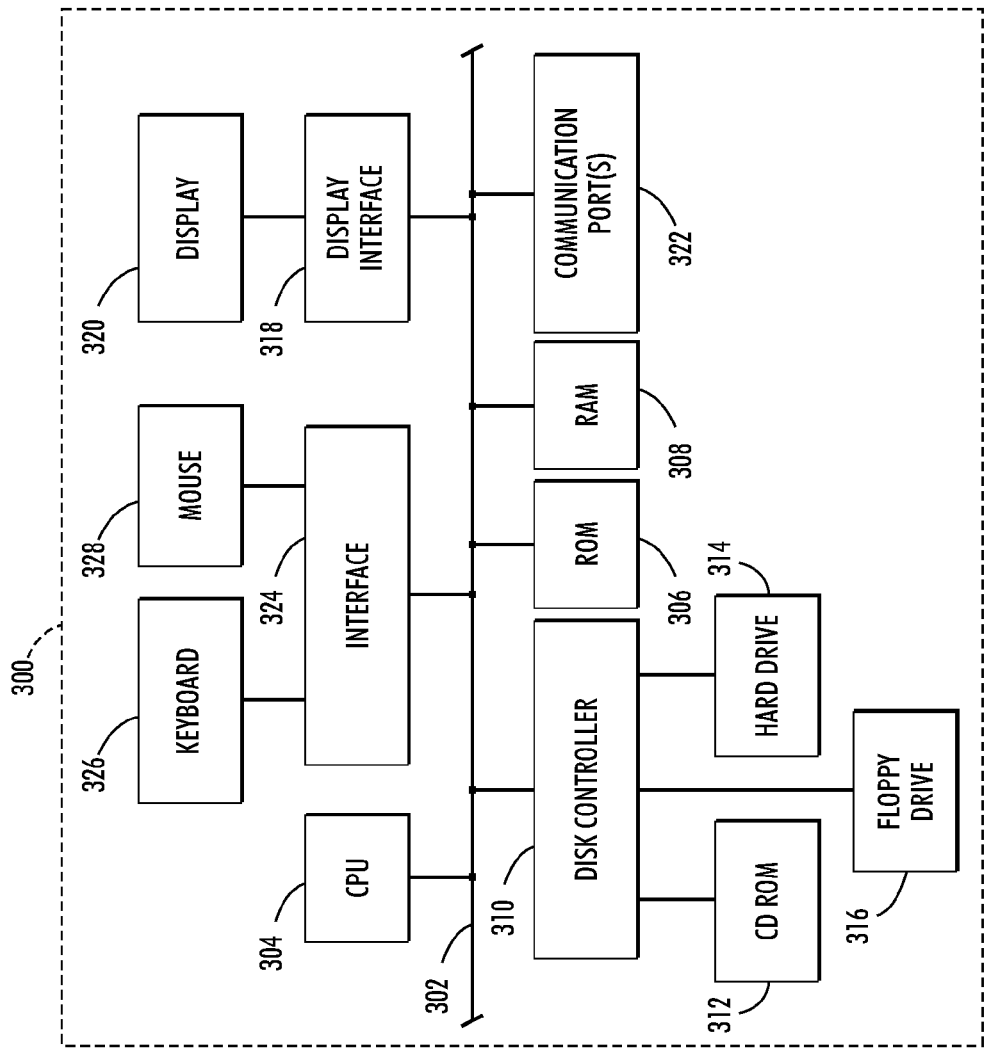
FIG. 3 illustrates one embodiment of a block diagram of a computer system useful for implementing various aspects of the method of FIGS. 1 and 2.

Reference is now being made to the flow diagram of FIG. 2 which is a continuation of the flow diagram of FIG. 1 with flow processing continuing with respect to node A.

At step 112, after the $N^{th}$ component sensitivity matrix has been generated, a last component sensitivity matrix is calculated as a gradient of the $N^{th}$ intermediate component $IC_N$ computed with respect to the second color space $CS_2$. This, in general, is given by: $\nabla_{CS_2}^{IC_N}$. In this example, the $4^{th}$ intermediate component is $R(\lambda)$, and the second color space CMYK. Thus, the last component sensitivity matrix would be given as: $\nabla_{CMYK}^{R(\lambda)}$.

At this point, where the first color space is RGB and the second color space is CMYK and the intermediate components were: CMYKOV, cmyk, W, and $R(\lambda)$, we have the following component sensitivity matrices: $\nabla_{CMYKOV}^{RGB}$, $\nabla_{cmyk}^{CMYKOV}$, $\nabla_W^{cmyk}$, $\nabla_{R(\lambda)}^W$, and $\nabla_{CMYK}^{R(\lambda)}$.

At step 114, once all the component sensitivity matrices have been calculated, a sensitivity matrix is generated using a chain rule of differentiation over each successive component sensitivity matrix. In the notation hereof, where i=1 to N, the sensitivity matrix β comprises:

$$\beta = \nabla_{IC_{j=1}}^{CS_1} \times \nabla_{IC_{j=2}}^{IC_{j=1}} \times \nabla_{IC_{j=3}}^{IC_{j=2}} \times \ldots \times \nabla_{IC_{j=N}}^{IC_{j=N-1}} \times \nabla_{CS_2}^{IC_{j=N}}.$$

In the example hereof, the sensitivity matrix comprises:

$$\beta = \nabla_{CMYKOV}^{RGB} \times \nabla_{cmyk}^{CMYKOV} \times \nabla_W^{cmyk} \times \nabla_{R(\lambda)}^W \times \nabla_{CMYK}^{R(\lambda)}.$$

It should be appreciated that other combinations of intermediate components and differing color spaces are intended to fall within the scope of the appended claims.

At step 116, the generated sensitivity matrix is used to calibrate a dynamically varying color marking device capable of device-independent color correction. The generated sensitivity matrix may further be stored to a memory or storage device or communicated to a remote device such as a color marking device, image processing system, or computer workstation over a network.

Various Example Embodiments

For example, if the first color space was L*a*b* and second color space was CMYKOV, and the intermediate component was $R(\lambda)$, the sensitivity matrix generated hereby would comprise:

$$\beta = \nabla_{R(\lambda)}^{L^*a^*b^*} \times \nabla_{CMYKOV}^{R(\lambda)}.$$

In another example, if the first color space was L*a*b* and second color space was XYZ, and the intermediate components were CMYK and cmyk, the sensitivity matrix generated hereby would comprise:

$$\beta = \nabla_{CMYK}^{L^*a^*b^*} \times \nabla_{cmyk}^{CMYK} \times \nabla_{XYZ}^{cmyk}.$$

In another example, if the first color space was CMYK and second color space was CMYKOV, and the intermediate components were L*a*b*, XYZ, and $R(\lambda)$, the sensitivity matrix generated hereby would comprise:

$$\beta = \nabla_{L^*a^*b^*}^{CMYK} \times \nabla_{XYZ}^{L^*a^*b^*} \times \nabla_{R(\lambda)}^{XYZ} \times \nabla_{CMYKOV}^{R(\lambda)}.$$

In yet another example, if the first color space was XYZ and second color space was RGB, and the intermediate components were L*a*b*, CMYK, and sRGB, the sensitivity matrix generated hereby would comprise:

$$\beta = \nabla_{L^*a^*b^*}^{XYZ} \times \nabla_{CMYK}^{L^*a^*b^*} \times \nabla_{sRGB}^{CMYK} \times \nabla_{RGB}^{sRGB}.$$

In yet another example, if the first color space was XYZ and second color space was HSV, and the intermediate components were L*a*b* and CMYK, the sensitivity matrix generated hereby would comprise:

$$\beta = \nabla_{HSV}^{XYZ} \times \nabla_{L^*a^*b^*}^{HSV} \times \nabla_{CMYK}^{L^*a^*b^*} \times \nabla_{HSV}^{CMYK}.$$

One embodiment of determining the sensitivity function for a Neugebauer model with random mixing is as follows. It should be understood that, while the present method has been described in conjunction with one embodiment for random mixing model, a similar approach is applicable for a dot-on-dot mixing model.

Sixteen (16) primaries are generated and their corresponding reflectance spectra, given by: $R_i(\lambda)$=i=1, 2, ..., 16, are measured. The measured reflectance spectra are referred to herein as primary reflectance spectra. This requires printing 16 patches with 100% area coverage in each separation. Details of the mixing are shown below in the following colors.

White=$R_W$(no toner)=$R_1$
Black=$R_k$=$R_2$
Yellow=$R_y$=$R_3$
Yellow, Black=$R_{yk}$=$R_4$
Magenta=$R_m$=$R_5$
Magenta, Black=$R_{mk}$=$R_6$
Magenta, Yellow=$R_{my}$=$R_7$
Magenta, Yellow, Black=$R_{myk}$=$R_8$
Cyan=$R_c$=$R_9$
Cyan, Black=$R_{ck}$=$R_{10}$
Cyan, Yellow=$R_{cy}$=$R_{11}$
Cyan, Yellow, Black=$R_{cyk}$=$R_{12}$
Cyan, Magenta=$R_{cm}$=$R_{13}$
Cyan, Magenta, Black=$R_{cmk}$=$R_{14}$
Cyan, Magenta, Yellow=$R_{cmy}$=$R_{15}$
Cyan, Magenta, Yellow, Black=$R_{cmyk}$=$R_{16}$ A total of 10 single separation cyan patches (anywhere between 0% cyan to 100%, excluding 0% and 100%) are printed. Their corresponding reflectance spectra, as given by: $R_{ci}(\lambda)$, i=1, 2, . . . , 10, is measured. The fractional area coverages are computed using, for example, the least square approach, as given by:

$$c(i) = \frac{\sum_\lambda [R_W^{\frac{1}{n}}(\lambda) - R_{ci}^{\frac{1}{n}}(\lambda)][R_W^{\frac{1}{n}}(\lambda) - R_{ci}^{\frac{1}{n}}(\lambda)]}{\sum_\lambda [R_W^{\frac{1}{n}}(\lambda) - R_{ci}^{\frac{1}{n}}(\lambda)]^2}, i = 1, 2, \ldots, 10$$

where $R_{ci}$ is the reflectance spectra of the $i^{th}$ cyan patch, and n represents the Yule-Nielson correction factor which varies between 1 and 2.5. Using the computed fractional area coverages, a dot growth function for cyan can be constructed.

The following steps are repeated for other separations; a) compute their weights using similar equation shown above for cyan, and b) build magenta, yellow and black dot growth functions. This calculation produces a printer model.

In order to generate a component sensitivity matrix, for example, for a given CMYK target patch, the following are performed. A dot growth function is used to compute dot areas c, m, y, k corresponding to the digital value of the colorants C, M, Y, and K for the target patch. Mixing equations are used to compute the Neugebauer primaries, given by: w(i), i=1 to 16, such that:

$w(1)=(1-c)(1-m)(1-y)(1-k)$ $w(2)=(1-c)(1-m)(1-y)k$ $w(3)=(1-c)(1-m)y(1-k)$ $w(4)=(1-c)(1-m)yk$ $w(5)=(1-c)m(1-y)(1-k)$ $w(6)=(1-c)m(1-y)k$ $w(7)=(1-c)my(1-k)$ $w(8)=(1-c)myk$ $w(9)=c(1-m)(1-y)(1-k)$ $w(10)=c(1-m)(1-y)k$ $w(11)=c(1-m)y(1-k)$ $w(12)=c(1-m)yk$ $w(13)=cm(1-y)(1-k)$ $w(14)=cm(1-y)k$ $w(15)=cmy(1-k)$ $w(16)=cmyk$ The primary reflectance spectra and the Neugebauer primaries are used to compute a predicted reflectance of the target patch. In one embodiment, this is given by:

$$R(\lambda) = \left[\sum_{i=1}^{16} w(i) R_i^{\frac{1}{n}}(\lambda)\right]^n.$$

The values of XYZ and L*a*b* are computed using the following:

$$X = 100 \frac{\sum_\lambda R(\lambda) D_{50}(\lambda) x(\lambda)}{\sum_\lambda D_{50}(\lambda) y(\lambda)}$$

$$Y = 100 \frac{\sum_\lambda R(\lambda) D_{50}(\lambda) y(\lambda)}{\sum_\lambda D_{50}(\lambda) y(\lambda)}$$

$$Z = 100 \frac{\sum_\lambda R(\lambda) D_{50}(\lambda) z(\lambda)}{\sum_\lambda D_{50}(\lambda) y(\lambda)}$$

$R(\lambda)$=Refectance spectra $D_{50}(\lambda)$=Standard illuminant $\lambda$=[380 730]

$x(\lambda), y(\lambda), z(\lambda)$, are color matching functions $$L^* = 116\left[f\left(\frac{Y}{Y_n}\right) - \frac{16}{116}\right]$$

$$a^* = 500\left[f\left(\frac{X}{X_n}\right) - f\left(\frac{Y}{Y_n}\right)\right]$$

$$b^* = 200\left[f\left(\frac{Y}{Y_n}\right) - f\left(\frac{Z}{Z_n}\right)\right]$$

$$f(x) = \begin{cases} x^{\frac{1}{3}} & \text{if } x \geq 0.008856 \\ 7.787x + \frac{16}{116} & x \leq 0.008856 \end{cases}$$

$X_n, Y_n, Z_n$ are tristimulus values of the reference white

The gradient of L*a°b* is computed with respect to XYZ, as given by:

$$\nabla_{XYZ}^{L^*a^*b^*} = \begin{bmatrix} \frac{\partial L^*}{\partial X} & \frac{\partial L^*}{\partial Y} & \frac{\partial L^*}{\partial Z} \\ \frac{\partial a^*}{\partial X} & \frac{\partial a^*}{\partial Y} & \frac{\partial a^*}{\partial Z} \\ \frac{\partial b^*}{\partial X} & \frac{\partial b^*}{\partial Y} & \frac{\partial b^*}{\partial Z} \end{bmatrix}$$

After differentiation, the gradient is given by:

$$\nabla_{XYZ}^{L^*a^*b^*} = \begin{bmatrix} 0 & \frac{116}{Y_n} g\left(\frac{Y}{Y_n}\right) & 0 \\ \frac{500}{X_n} g\left(\frac{X}{X_n}\right) & -\frac{500}{Y_n} g\left(\frac{Y}{Y_n}\right) & 0 \\ 0 & \frac{200}{Y_n} g\left(\frac{Y}{Y_n}\right) & -\frac{200}{Z_n} g\left(\frac{Z}{Z_n}\right) \end{bmatrix},$$

$$g(\alpha) = \begin{cases} \frac{1}{3}\alpha^{-\frac{2}{3}} & \alpha > 0.008856 \\ 7.787 & \alpha \le 0.008856. \end{cases}$$

The gradient of XYZ is computed with respect to the reflectance spectra, $R(\lambda)$, $\nabla_{R(\lambda)}{}^{XYZ}=3\times31$, such that:

$$\nabla_{R(\lambda)}^{XYZ} = \begin{bmatrix} \frac{x*D_{50}}{\sum D_{50}y} \\ \frac{y*D_{50}}{\sum D_{50}y} \\ \frac{z*D_{50}}{\sum D_{50}y} \end{bmatrix} = \begin{bmatrix} E_1 \\ E_2 \\ E_3 \end{bmatrix}$$

where $F_1, F_2, F_3$ are row vectors with dimension $1\times31$. The vectors x, y and z and $D_{50}$ used above are defined in the above-referenced *Principles of Color Technology*.

The gradient of $R(\lambda)$ is computed with respect to Neugebauer primary areas, given by: $\nabla_W{}^{R(\lambda)}=31\times16$, such that: $\nabla_W{}^{R(\lambda)}=[r_1, r_2, \ldots r_{16}]$ where $r_i$ is a $31\times1$ column vector, given by:

$$r_i = nR(\lambda)^{\frac{n-1}{n}} R_i(\lambda)^{\frac{1}{n}},$$

where i=1 to 16.

The gradient of the Neugebauer primary areas is then computed with respect to dot areas, given by: $\nabla_{cmyk}{}^W=16\times4$. The analytical expression for the gradient is shown below.

The gradient of the dot areas can be computed with respect to input digital values, given by: $\nabla_{CMYK}{}^{cmyk}=4\times4$, such that:

$$\nabla_{CMYK}^{cmyk} = \begin{bmatrix} \frac{dc}{dC} & 0 & 0 & 0 \\ 0 & \frac{dm}{dM} & 0 & 0 \\ 0 & 0 & \frac{dy}{dY} & 0 \\ 0 & 0 & 0 & \frac{dk}{dK} \end{bmatrix},$$

where $\frac{dc}{dC}, \frac{dm}{dM}, \frac{dy}{dY},$ and $\frac{dk}{dK}$ are slopes of cyan, magenta, yellow and black dot growth functions evaluated at the target CMYK patch. It should be noted that the cyan dot area depends only on the cyan digital value. Similarly the magenta, yellow and black depend on their corresponding digital values only.

The sensitivity matrix can then be computed using chain rule of differentiation, such that:

$$B = \nabla_{CMYK}{}^{Lab} = \nabla_{XYZ}{}^{Lab} \times \nabla_{R(\lambda)}{}^{XYZ} \times \nabla_W{}^{R(\lambda)} \times \nabla_{cmyk}{}^W \times \nabla_{CMYK}{}^{cmyk}.$$

Reference is now being made to the system of FIG. 2 illustrating one embodiment of a block diagram of a special purpose computer system useful for implementing various aspects of the present method as described above with respect to the flow diagrams of FIGS. 1 and 2. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method. All or portions of the diagrams of the present method, as illustrated herein, may be implemented partially or fully in hardware in conjunction with machine executable instructions in communication with various components of such a system. The nature of the exact implementation will depend on the image processing environment wherein the present method finds its intended uses.

Communications bus 302 serves as an information highway interconnecting the other illustrated components of special purpose computer system 300. The special purpose computer incorporates a central processing unit (CPU) 304 capable of executing machine readable program instructions for performing any of the calculations, comparisons, logical operations, object identifications and extractions, user marking identifications and extractions, and other program instructions for performing the methods described above with respect to the flow diagrams and illustrated embodiments hereof. The CPU is in communication with Read Only Memory (ROM) 306 and Random Access Memory (RAM) 308 which, collectively, constitute example memory storage devices. Such memory may be used to store machine readable program instructions and other program data and results to sufficient to carry out any of the functionality described herein. Disk controller 310 interfaces with one or more storage devices 314. These storage devices may comprise external memory, zip drives, flash memory, USB drives, memory sticks, or other storage devices with removable media such as CD-ROM drive 312 and floppy drive 316. Machine executable program instructions for executing the methods hereof or for performing any of the functionality discussed with respect to the flow diagrams of FIGS. 1 and 2. Any of the document images and bitmaps may also be stored on any of these storage devices. Example computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs are stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein. Display interface 318 effectuates the display of information on display device 320 in various formats such as, for instance, audio, graphic, text, and the like. Interface 324 effectuates a communication via keyboard 326 and mouse 328. Such a graphical user interface is useful for a user to review any of the identified objects and/or user markings and for entering object identification information about any of the displayed information in accordance with various embodiments hereof. Communication with external devices may occur using example communication port(s) 322. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports 322 are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for generating a sensitivity matrix, the method comprising:

identifying a first color space $CS_1$ of a first color device and a second color space $CS_2$ of a second color device, said first and second color spaces being different;

identifying a total of N intermediate components, $IC_i$, where i=1 to N;

calculating a first component sensitivity matrix as a gradient of said first color space $CS_1$ computed with respect to a first intermediate component $IC_1$;

for each intermediate component i=2 to N, calculating an $i^{th}$ component sensitivity matrix as a gradient of intermediate component $IC_{i-1}$ computed with respect to intermediate component $IC_i$;

calculating a last component sensitivity matrix as a gradient of intermediate component $IC_N$ computed with respect to said second color space $CS_2$;

generating a sensitivity matrix β using a chain rule of differentiation over each component sensitivity matrix such that:

$$\beta = \nabla_{IC_i=1}^{CS_1} \times \nabla_{IC_i=2}^{IC_i=1} \times \nabla_{IC_i=3}^{IC_i=2} \times \ldots \times \nabla_{IC_i=N}^{IC_i=N-1} \times \nabla_{CS_2}^{IC_i=N}; \text{ and}$$

using said sensitivity matrix to calibrate a dynamically varying color marking device capable of device-independent color correction.

2. The method of claim 1, wherein said first and second color spaces comprise any of: RGB color space, CMYK color space, CIE color space, YUV color space, HSV color space, HSL color space, LMS color space, and any of: Hexachrome, RYB, Munsell, Imaginary, NCS, PMS, RAL, OSA-UCS, Coloroid, RG, Ostwald, DIN, PCCS, ABC, DCA, JIS Z8102, and ISCC-NBS.

3. A system for generating a sensitivity matrix, the system comprising:

a memory;

a storage medium for storing data; and a processor in communication with the storage medium and the memory, the processor executing machine readable program instructions for performing the method of:

identifying a first color space $CS_1$ of a first color device and a second color space $CS_2$ of a second color device, said first and second color spaces being different;

identifying a total of N intermediate components, $IC_i$, where i=1 to N;

calculating a first component sensitivity matrix as a gradient of said first color space $CS_1$ computed with respect to a first intermediate component $IC_1$;

for each intermediate component i=2 to N, calculating an component sensitivity matrix as a gradient of intermediate component $IC_{i-1}$ computed with respect to intermediate component $IC_i$;

calculating a last component sensitivity matrix as a gradient of intermediate component $IC_N$ computed with respect to said second color space $CS_2$;

generating a sensitivity matrix β using a chain rule of differentiation over each component sensitivity matrix such that:

$$\beta = \nabla_{IC_{i=1}}^{CS_1} \times \nabla_{IC_{i=2}}^{IC_{i=1}} \times \nabla_{IC_{i=3}}^{IC_{i=2}} \times \ldots \times \nabla_{IC_{i=N}}^{IC_{i=N-1}} \times \nabla_{CS_2}^{IC_{i=N}}; \text{ and}$$

using said sensitivity matrix to calibrate a dynamically varying color marking device capable of device-independent color correction.

4. The system of claim 3, wherein said first and second color spaces comprise any of: RGB color space, CMYK color space, CIE color space, YUV color space, HSV color space, HSL color space, LMS color space, and any of: Hexachrome, RYB, Munsell, Imaginary, NCS, PMS, RAL, OSA-UCS, Coloroid, RG, Ostwald, DIN, PCCS, ABC, DCA, JIS Z8102, and ISCC-NBS.

5. A computer implemented method for generating a sensitivity matrix, the method comprising:

determining what control operation said second device is being characterized for identifying a first color space $CS_1$ of a first color device and a second color space $CS_2$ of a second color device, said first and second color spaces comprise any of: RGB color space, CMYK color space, CIE color space, YUV color space, HSV color space, HSL color space, LMS color space, and any of: LMS, Hexachrome, RYB, Munsell, NCS, PMS, RAL, OSA-UCS, Coloroid, RG, Ostwald, DIN, PCCS, ABC, DCA, JIS Z8102, ISCC-NBS, and Imaginary;

identifying a total of N intermediate components, $IC_i$, where i=1 to N, wherein said intermediate components is any of: RGB, sRGB, CMYK, CMYKOV, L*a*b*, cmyk, W, R(λ), LUV, UVW, XYZ, HSL, HSV, YIQ, YUV, said intermediate components being different than any of said first and second color spaces;

calculating a first component sensitivity matrix as a gradient of said first color space $CS_1$ computed with respect to a first intermediate component $IC_i$;

for each intermediate component i=2 to N, calculating an $i^{th}$ component sensitivity matrix as a gradient of intermediate component $IC_{i-1}$ computed with respect to intermediate component $IC_i$;

calculating a last component sensitivity matrix as a gradient of intermediate component $IC_N$ computed with respect to said second color space $CS_2$;

generating a sensitivity matrix β using a chain rule of differentiation over each component sensitivity matrix such that:

$$\beta = \nabla_{IC_{i=1}}^{CS_1} \times \nabla_{IC_{i=2}}^{IC_{i=1}} \times \nabla_{IC_{i=3}}^{IC_{i=2}} \times \ldots \times \nabla_{IC_{i=N}}^{IC_{i=N-1}} \times \nabla_{CS_2}^{IC_{i=N}}; \text{ and}$$

using said sensitivity matrix to calibrate a dynamically varying color marking device capable of device-independent color correction.

* * * * *